US009602764B2

(12) United States Patent
Song et al.

(10) Patent No.: US 9,602,764 B2
(45) Date of Patent: Mar. 21, 2017

(54) METHOD FOR IMPLEMENTING VIDEO CALLS ON COMMUNICATION TERMINAL AND COMMUNICATION TERMINAL THEREOF

(75) Inventors: Hongping Song, Beijing (CN); Chao Gong, Beijing (CN)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 420 days.

(21) Appl. No.: 13/980,810

(22) PCT Filed: Jan. 16, 2012

(86) PCT No.: PCT/CN2012/070422
§ 371 (c)(1),
(2), (4) Date: Oct. 10, 2013

(87) PCT Pub. No.: WO2012/097717
PCT Pub. Date: Jul. 26, 2012

(65) Prior Publication Data
US 2014/0036029 A1 Feb. 6, 2014

(30) Foreign Application Priority Data
Jan. 21, 2011 (CN) .......................... 2011 1 0024144

(51) Int. Cl.
H04M 7/14 (2006.01)
H04N 7/14 (2006.01)
H04M 1/725 (2006.01)
(52) U.S. Cl.
CPC ............. *H04N 7/147* (2013.01); *H04N 7/148* (2013.01); *H04M 1/72522* (2013.01)
(58) Field of Classification Search
USPC ...................................................... 348/14.11
See application file for complete search history.

(56) References Cited

U.S. PATENT DOCUMENTS 8,411,127 B2 * 4/2013 Yoon ................. H04M 1/72522
348/14.01
2007/0072642 A1 * 3/2007 Kangas ............. H04M 1/72522
455/552.1
(Continued)

FOREIGN PATENT DOCUMENTS

CN 1753553 A 3/2006
CN 101039409 A 9/2007
(Continued)

OTHER PUBLICATIONS

Chinese Search Report (Mar. 26, 2013—2 pages) in re: Chinese application No. CN 2011100241447.
(Continued)

*Primary Examiner* — Amal Zenati
(74) *Attorney, Agent, or Firm* — The Danamraj Law Group, P.C.; Thomas L. Crisman; Kenneth A. McClure

(57) ABSTRACT

The present invention discloses a method for implementing a video phone on a communication terminal, and the communication terminal thereof. The method comprises the steps of: determining, by the communication terminal, that it supports video phone services and is located in a second communication access network which supports the transmission of a second data contained in the video phone services; initiating or waiting for a video phone call; establishing and maintaining a video phone connection with a second communication terminal; and switching CS domain services to a first communication access network which supports the transmission of a first data contained in the CS domain services after the video phone connection is terminated. The second communication access network supports the transmission of the second data contained in the video phone services, so it is able to implement the video phone services in the second communication access network in accordance with a predetermined service process, and to (Continued)

implement the CS domain services via the first communication access network in an area not covered by the second communication access network.

11 Claims, 4 Drawing Sheets

(56) References Cited

U.S. PATENT DOCUMENTS

2007/0126861 A1   6/2007  Kim et al.
2011/0012987 A1   1/2011  Yoon

FOREIGN PATENT DOCUMENTS

| CN | 101083615 A | 12/2007 |
|----|-------------|---------|
| CN | 101083700 A | 12/2007 |
| CN | 102143542 A | 8/2011 |
| WO | 2006023928 A | 3/2006 |

OTHER PUBLICATIONS

International Search Report (mailed Apr. 19, 2012—2 pages) in re: International application No. PCT/CN2012/070422.

* cited by examiner

METHOD FOR IMPLEMENTING VIDEO CALLS ON COMMUNICATION TERMINAL AND COMMUNICATION TERMINAL THEREOF

TECHNICAL FIELD

The present invention relates to the field of communication terminal technology, in particular to a method for implementing a video phone on a communication terminal and the communication terminal thereof.

BACKGROUND

Along with the development of communication technologies, various network access technologies have been used in current networks. On the one hand, new network devices may be selected during the building of networks so as to provide a signal card with better services, and old network devices may continue to be used so as to reduce cost and provide users with services. On the other hand, operators may select different network technologies to provide different types of services. As a result, for the network devices of an identical operator, the network will be built by using different access technologies. This requires that a communication terminal can select a suitable network access technology in accordance with a current service type and a network resource status, so as to obtain better services.

In the prior art, it is impossible to implement video phone services on a single-card-dual-standby communication terminal. This is because the video phone services, as Circuit Switched (CS) domain services, cannot be supported by a GSM network. Although a TD-SCDMA network can be used to implement the video phone services, the single-card-dual-standby communication terminal will, by default, preferably register the CS domain services in the GSM network and register Packet Switched (PS) domain services in the TD-SCDMA network.

The inventor finds that there exists the following problem in the prior art, i.e., in the existing communication networks, the GSM network can support the CS domain services but cannot support the video phone services. As a result, it is impossible for the existing single-card-dual-standby communication terminal to implement the video phone services.

SUMMARY

An object of the present invention is to provide a method for implementing a video phone on a single-card-dual-standby communication terminal, and the communication terminal thereof, so as to overcome the drawback that it is impossible for the single-card-dual-standby communication terminal (whose CS domain services are preferably registered in a GSM network) to implement video phone services because the existing GSM network can support the CS domain services but cannot support the video phone services of the CS domain services.

In order to achieve the above object, the present invention provides a method for implementing a video phone on a communication terminal, comprising: determining, by the communication terminal, that it supports video phone services and is located in a second communication access network which supports the transmission of a second data contained in the video phone services; initiating or waiting for a video phone call; establishing and maintaining a video phone connection with a second communication terminal; and switching CS domain services to a first communication access network which supports the transmission of a first data contained in the CS domain services after the video phone connection is terminated, Prior to the step of determining, by the communication terminal, that it supports video phone services and is located in the second communication access network, the method further comprises: after a first protocol stack of the communication terminal receives a video phone call, notifying, via the first communication access network, a core network that the communication terminal is currently not in a service area of the second communication access network when it is determined that a second protocol stack is not in the second communication access network.

Prior to the step of determining, by the communication terminal, that it supports video phone services and is located in the second communication access network, the method further comprises: after the first protocol stack of the communication terminal receives the video phone call, notifying, via the first communication access network, the core network that the communication terminal is currently in the service area of the second communication access network when it is determined that the second protocol stack is in the second communication access network.

The step of determining, by the communication terminal, that it can support video phone services and is located in a second communication access network further comprises: when the communication terminal supports the video phone services and is located in the second communication access network, switching the CS domain services to the second communication access network, updating current position information of the communication terminal in the second communication access network, and waiting for the video phone call.

Subsequent to the step of switching CS domain services to the first communication access network after the video phone connection is terminated, the method further comprises: updating the current position information of the communication terminal in the first communication access network.

The present invention further provides a communication terminal, comprising: a network positioning unit, configured to determine that the communication terminal supports video phone services and is located in a second communication access network which supports the transmission of a second data contained in the video phone services; a calling unit, configured to initiate or wait for a video phone call; a video phone connecting unit, configured to establish and maintain a video phone connection with a second communication terminal; and a communication network switching unit, configured to switch CS domain services to a first communication access network which supports the transmission of a first data contained in the CS domain services after the video phone connection is terminated.

The communication terminal further comprises: a first protocol stack module, connected to a second protocol stack module, configured to store a protocol desired for operation when the communication terminal is in the first communication access network, and after a video phone call is received, notify, via the first communication access network, a core network that the communication terminal is currently not in a service area of the second communication access network when it is determined that the second protocol stack is not in the second communication access network, and the second protocol stack module configured to store a protocol desired for operation when the communication terminal in the second communication access network.

The first protocol stack module connected to the second protocol stack module is further configured to, after the video phone call is received, notify, via the first communication access network, the core network that the communication terminal is currently in the service area of the second communication access network when it is determined that the second protocol stack is in the second communication access network.

The communication terminal further comprises: a second position information updating module, configured to, when the communication terminal switches the CS domain services to the second communication access network, update current position information of the communication terminal in the second communication access network.

The communication terminal further comprises: a first position information updating module, configured to, when the communication terminal switches the CS domain services back to the first communication access network, update current position information of the communication terminal in the first communication access network.

The present invention has the following beneficial effect. The second communication access network supports the transmission of the second data contained in the video phone services, so it is able to implement the video phone services in the second communication access network in accordance with a predetermined service process, and to implement the CS domain services via the first communication access network in an area not covered by the second communication access network.

DETAILED DESCRIPTION

To make the technical problems, the technical solutions and the advantages of the present invention more apparent, the present invention is described hereinafter in conjunction with the drawings.

CS domain services include voice services, video phone services, short message services and so on. However, the current GSM network can merely support the CS domain services other than the video phone services.

Figure 1:
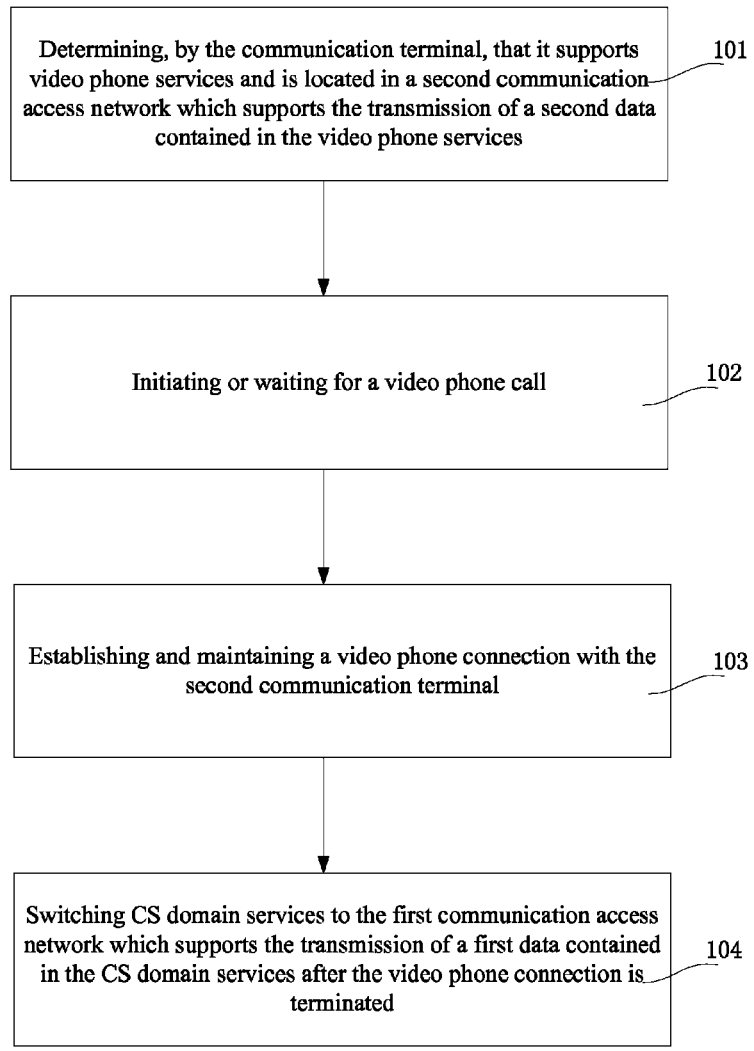
FIG. 1 is a flow chart of a method for implementing a video phone on a communication terminal according to embodiments of the present invention.

As shown in FIG. 1, a method for implementing a video phone on a communication terminal comprises:

Step 101: determining, by the communication terminal, that it supports video phone services, a first protocol stack module is located in a first communication access network and a second protocol stack module is located in a second communication access network which supports the transmission of second data contained in the video phone services;

Step 102: initiating or waiting for a video phone call;

Step 103: establishing and maintaining a video phone connection with the second communication terminal via the second protocol stack module; and Step 104: switching CS domain services to the first communication access network which supports the transmission of a first data contained in the CS domain services after the video phone connection is terminated.

According to the method, the second communication access network supports the transmission of the second data contained in the video phone services, so it is able to implement the video phone services in the second communication access network in accordance with a predetermined service process, and to implement the CS domain services via the first communication access network in an area not covered by the second communication access network.

The communication terminal may be a single-card-dual-standby communication terminal. The term "single-card-dual-standby" means that a single (U) SIM card is mounted in one communication terminal with two modes, both being able to be in a standby state, where CS domain services are registered in the first communication access network and PS domain services are registered in the second communication access network.

When the communication terminal switches the CS domain services from the first communication access network to the second communication access network, it needs to perform position update, i.e., to update the current position information of the communication terminal in the second communication access network. When the communication terminal switches the CS domain services from the second communication access network back to the first communication access network, it also needs to perform position update, i.e., to update the current position information of the communication terminal in the first communication access network.

The step of determining, by the communication terminal, that it can support video phone services and is located in a second communication access network further comprises: when the communication terminal supports the video phone services and is located in the second communication access network, switching, by the communication terminal, the CS domain services to the second communication access network, and updating the current position information of the communication terminal in the second communication access network. The first communication access network may be a 2G network, e.g., a GSM network which can support CS domain services other than video phone services (it can also support PS domain services but the rate thereof is not as high as in a 3G network). The second communication access network may be a 3G access network, such as a TD-SCDMA network, which can support both CS domain services and data domain services. The switching of the CS domain services to the second communication access network means registering the CS domain service in the TD-SCDMA network so that the CS domain services reside in the TD-SCDMA network.

Figure 2:
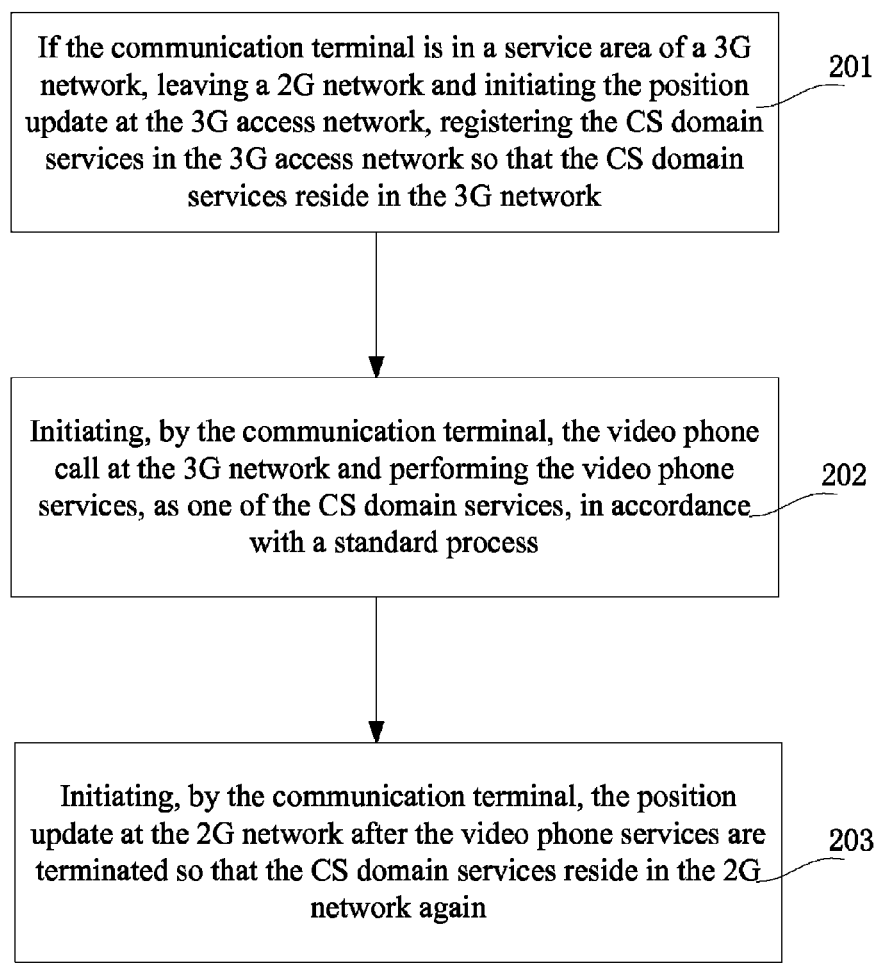
FIG. 2 is a flow chart of initiating a video phone call by a calling party according to embodiments of the present invention.

In an application scenario where the communication terminal serves as a calling party, when a video phone call is initiated toward the second communication access network, as shown in FIG. 2, the method comprises the following steps:

Step 201: if the communication terminal is in a service area of a 3G network, leaving a 2G network and initiating the position update at the 3G access network, i.e., registering the CS domain services in the 3G access network so that the CS domain services reside in the 3G network;

Step 202: initiating, by the communication terminal, the video phone call at the 3G network and performing the video phone services, as one of the CS domain services, in accordance with a standard process; and Step 203: initiating, by the communication terminal, the position update at the 2G network after the video phone services are terminated so that the CS domain services reside in the 2G network again.

Figure 3:
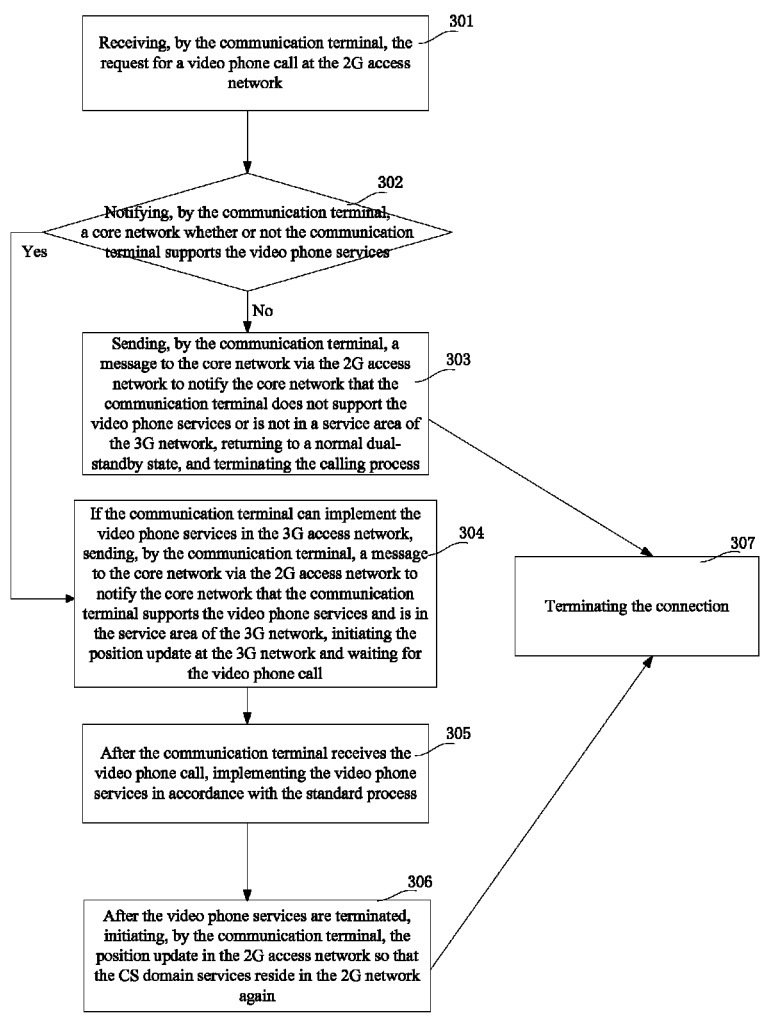
FIG. 3 is a flow chart of receiving a video phone call by a called party according to embodiments of the present invention.

In an application scenario where the communication terminal serves as a called party, when a request for a video phone call is received and processed, as shown in FIG. 3, the method further comprises the following steps:

Step 301: receiving, by the communication terminal, the request for a video phone call at the 2G access network;

Step 302: notifying, by the communication terminal, a core network whether or not the communication terminal supports the video phone services, if the communication terminal supports the video phone services and is currently in an service area of the 3G network, proceeding to Step 304, and otherwise, proceeding to Step 303;

Step 303: sending, by the communication terminal, a message to the core network via the 2G access network to notify the core network that the communication terminal does not support the video phone services or is not in a service area of the 3G network, returning to a normal dual-standby state, terminating the calling process, and proceeding to Step 307;

Step 304: if the communication terminal can implement the video phone services in the 3G access network, sending, by the communication terminal, a message to the core network via the 2G access network to notify the core network that the communication terminal supports the video phone services and is in the service area of the 3G network, initiating the position update at the 3G network and waiting for the video phone call;

Step 305: after the communication terminal receives the video phone call, implementing the video phone services in accordance with the standard process;

Step 306: after the video phone services are terminated, initiating, by the communication terminal, the position update in the 2G access network so that the CS domain services reside in the 2G network again; and Step 307: terminating the connection.

Prior to the step of determining, by the communication terminal, that it supports video phone services and is located in a second communication access network, the method further comprises: after a first protocol stack of the communication terminal receives a video phone call, notifying, via the first communication access network, a core network that the communication terminal is currently not in a service area of the second communication access network when it is determined that a second protocol stack is not in the second communication access network; and after the first protocol stack of the communication terminal receives the video phone call, notifying, via the first communication access network, the core network that the communication terminal is currently in the service area of the second communication access network when it is determined that the second protocol stack is in the second communication access network. In this embodiment, preferably a GSM network is used as the first communication access network, and a TD-SCDMA network is used as the second communication access network, so in an application scenario, the first protocol stack is a GSM network protocol stack, and the second protocol stack is a TD-SCDMA protocol stack.

If the communication terminal is a called party and it is judged that the TD-SCDMA network protocol stack is not in a service area of the TD-SCDMA network after the GSM network protocol stack receives the video phone call, a Release Complete message agreed in the protocol may be used to, for a certain reason, notify a mobile switching center, i.e., the core network, that the communication terminal is currently not in the service area of the TD-SCDMA network.

If it is judged that the TD-SCDMA network protocol stack is in a service area of the TD-SCDMA network after the GSM network protocol stack receives a request for the video phone call, the Release Complete message agreed in the protocol may be used to, for another reason, notify the mobile switching center, i.e., the core network, that the communication terminal can support the video phone services, the position update is initiated after switching to the TD-SCDMA network, and the video phone call is awaited in the second communication access network.

In an application scenario, the communication terminal can provide the user of an identical (U) SIM card with dual-standby services for the two communication modes, and can provide communication services simultaneously in the two communication modes in the case of multiple service requests. Based on the characteristics that the 3G network can provide high-speed data domain services and the GSM network, with a large coverage, can provide high-quality CS domain services, the principle of determining the networks for the services is to implement the data domain services preferably by the 3G access network and implement the CS domain services by the GSM access network. However, the GSM network can support the CS domain services other than the video phone services, so the video phone service will be implemented by switching the GSM network to the 3G access network.

Figure 4:
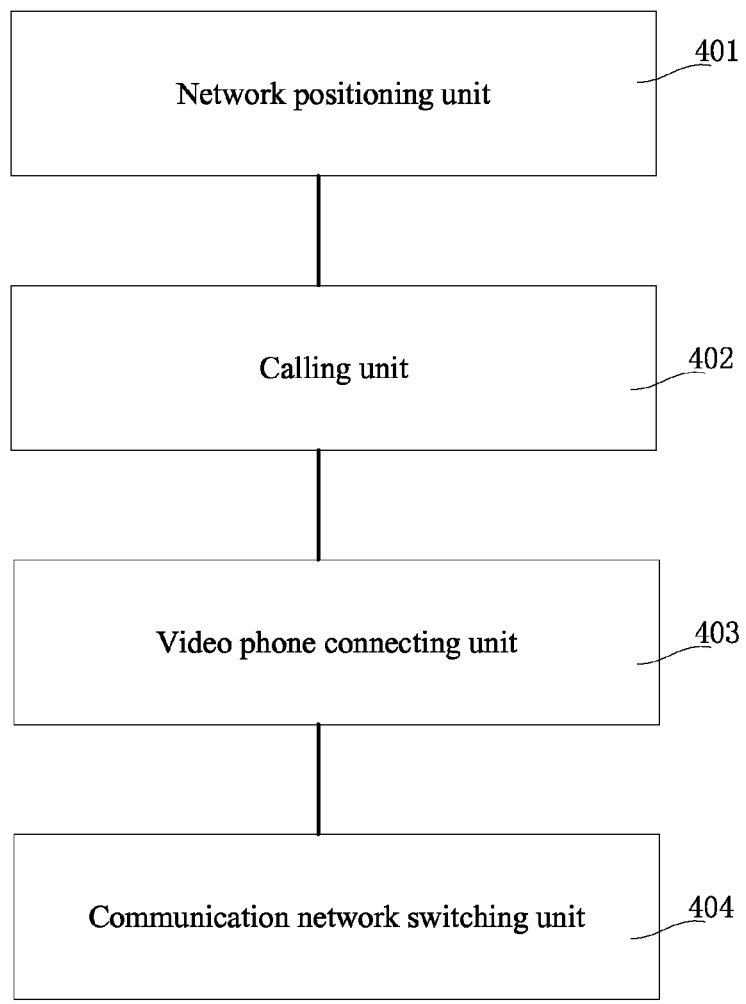
FIG. 4 is a structural schematic view showing a communication terminal according to embodiments of the present invention.

The present invention further provides a communication terminal which, as shown in FIG. 4, comprises:

a network positioning unit 401, configured to determine that the communication terminal supports video phone services and is located in a second communication access network which supports the transmission of a second data contained in the video phone services;

a calling unit 402, configured to initiate or wait for a video phone call;

a video phone connecting unit 403, configured to establish and maintain a video phone connection with a second communication terminal; and a communication network switching unit 404, configured to switch CS domain services back to a first communication access network which supports the transmission of a first data contained in the CS domain services after the video phone connection is terminated.

According to the communication terminal, the second communication access network supports the transmission of the second data contained in the video phone services, so it is able to implement the video phone services in the second communication access network in accordance with a predetermined service process, and to implement the CS domain services via the first communication access network in an area not covered by the second communication access network.

The communication terminal further comprises:

a first protocol stack module, connected to a second protocol stack module, configured to store a protocol desired for operation when the communication terminal is in the first communication access network, and after a video phone call is received, notify, via the first communication access network, a core network that the communication terminal is currently not in a service area of the second communication access network when it is determined that the second protocol stack is not in the second communication access network; and a second protocol stack module, configured to store a protocol desired for operation when the communication terminal in the second communication access network.

The first protocol stack module, connected to the second protocol stack module, is further configured to judge that the second protocol stack is in the second communication access network after the video phone call is received.

The communication terminal further comprises:

a second position information updating module, configured to, when the communication terminal switches the CS domain services to the second communication access network, update current position information of the communication terminal in the second communication access network; and a first position information updating module, configured to, when the communication terminal switches the CS domain services back to the first communication access network, update current position information of the communication terminal in the first communication access network.

The first communication access network may be a 2G network, e.g., a GSM network which supports the CS domain services other than the video phone services. The second communication access network may be a 3G network, e.g., a TD-SCDMA network which supports the data domain services and the CS domain services including the video phone services.

When the communication terminal serves as a calling party, during the process of initiating the video phone call toward the second communication terminal, the communication terminal will leave the 2G network if it is in the service area of the 3G network, initiate the position update process at the 3G network, and register the CS domain services in the 3G network so that the CS domain services reside in the 3G network. Since the CS domain services include the video phone services, it is able for the communication terminal to implement the video phone services.

When the communication terminal serves as a called party, if the communication terminal supports the video phone services and is currently located in the service area of the 3G network, it can implement the video phone services in the 3G network. It will notify the core network that it can support the video phone services, initiate the position update in the 3G network, and await the video phone call from the second communication terminal.

The second communication access network supports the transmission of the second data contained in the video phone services, so it is able to implement the video phone services in the second communication access network in accordance with a predetermined service process, and to implement the CS domain services via the first communication access network in an area not covered by the second communication access network.

The above are merely the embodiments of the present invention. It should be appreciated that, a person skilled in the art may further make improvements and modifications without departing from the principle of the present invention, and these improvements and modifications shall also be considered as the scope of the present invention.

What is claimed is:

1. A method for implementing a video phone on a first communication terminal, comprising:

determining, by the first communication terminal, that it supports video phone services and is located in a second communication access network which supports the transmission of a second data contained in the video phone services;

initiating or waiting for a video phone call;

establishing and maintaining a video phone connection for the video phone call with a second communication terminal via the second communication access network; and switching circuit-switched (CS) domain services, received by the first communication terminal in the second communication access network, to a first communication access network by registering the CS domain services in the first communication access network responsive to the video phone call ending;

wherein the first communication access network supports the transmission of a first data contained in the CS domain services and does not support the transmission of the second data contained in the video phone services.

2. The method according to claim 1, wherein prior to the step of determining, by the first communication terminal, that it supports video phone services and is located in the second communication access network, the method further comprises:

after a first protocol stack of the first communication terminal receives a video phone call request, notifying, via the first communication access network, a core network that the first communication terminal is currently not in a service area of the second communication access network when it is determined that a second protocol stack is not in the second communication access network.

3. The method according to claim 1, wherein prior to the step of determining, by the first communication terminal, that it supports video phone services and is located in the second communication access network, the method further comprises:

after a first protocol stack of the first communication terminal receives a video phone call request, notifying, via the first communication access network, a core network that the first communication terminal is currently in the service area of the second communication access network when it is determined that a second protocol stack is in the second communication access network.

4. The method according to claim 1, wherein the step of determining, by the first communication terminal, that it supports video phone services and is located in the second communication access network further comprises:

switching the CS domain services to the second communication access network, updating current position information of the first communication terminal in the second communication access network, and waiting for the video phone call.

5. The method according to claim 4, wherein subsequent to the step of switching the CS domain services to the first communication access network after the video phone connection is terminated, the method further comprises:

updating the current position information of the first communication terminal in the first communication access network.

6. A first communication terminal, comprising:

a network positioning unit, configured to determine that the first communication terminal supports video phone services and is located in a second communication access network which supports the transmission of a second data contained in the video phone services;

a calling unit, configured to initiate or wait for a video phone call;

a video phone connecting unit, configured to establish and maintain a video phone connection for the video phone call with a second communication terminal via the second communication access network; and a communication network switching unit, configured to switch circuit-switched (CS) domain services, received by the first communication terminal in the second communication access network, to a first communication access network by registering the CS domain services in the first communication access network responsive to the video phone call ending;

wherein the first communication access network supports the transmission of a first data contained in the CS domain services and does not support the transmission of the second data contained in the video phone services.

7. The first communication terminal according to claim 6, further comprising:

a first protocol stack module, connected to a second protocol stack module, configured to store a protocol desired for operation when the first communication terminal is in the first communication access network, and after a video phone call request is received, notify, via the first communication access network, a core network that the first communication terminal is currently not in a service area of the second communication access network when it is determined that the second protocol stack is not in the second communication access network; and the second protocol stack module, configured to store a protocol desired for operation when the first communication terminal is in the second communication access network.

8. The first communication terminal according to claim 7, wherein the first protocol stack module connected to the second protocol stack module is further configured to, after the video phone call request is received, notify, via the first communication access network, the core network that the first communication terminal is currently in the service area of the second communication access network when it is determined that the second protocol stack is in the second communication access network.

9. The first communication terminal according to claim 6, further comprising:

a second position information updating module, configured to, when the first communication terminal switches the CS domain services to the second communication access network, update current position information of the first communication terminal in the second communication access network.

10. The first communication terminal according to claim 6, further comprising:

a first position information updating module, configured to, when the first communication terminal switches the CS domain services back to the first communication access network, update current position information of the first communication terminal in the first communication access network.

11. A method, implemented in a first communication terminal, for implementing a video phone, the method comprising:

determining that the first communication terminal is within a service area of a second radio access technology network that supports the CS domain services and the video phone services, and in response, notifying the second radio access technology network, via the first radio access technology network, that the first communication terminal supports the video phone call via the second radio access technology network;

registering for the CS domain services in the second radio access technology network to switch the CS domain services from the first radio access technology network to the second radio access technology network;

accepting the video phone call via the second radio access technology network, and responsive to the video phone call ending, initiating a subsequent position update via the first radio access technology network to switch the CS domain services back to the first radio access technology network.

* * * * *